Figure 1:
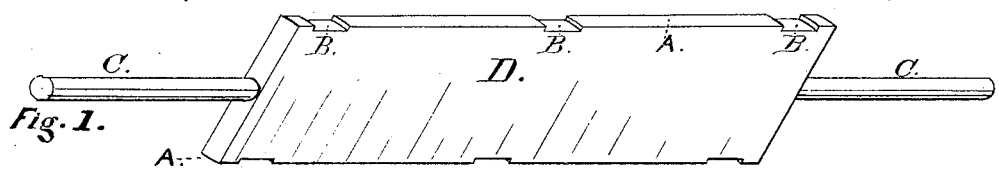

N. S. KEITH.
Dynamo-Electrical Machine.

No. 228,763. Patented June 15, 1880.

Witnesses:
Thaddeus Hyatt
Alex T. De Puy

Inventor:
N. S. Keith

N. S. KEITH.
Dynamo-Electrical Machine.

No. 228,763. Patented June 15, 1880.

Witnesses:
Hiram B. Crosby
Herman L. R. Emmet

Inventor:
N. S. Keith

3 Sheets—Sheet 3.
N. S. KEITH.
Dynamo-Electrical Machine.
No. 228,763. Patented June 15, 1880.
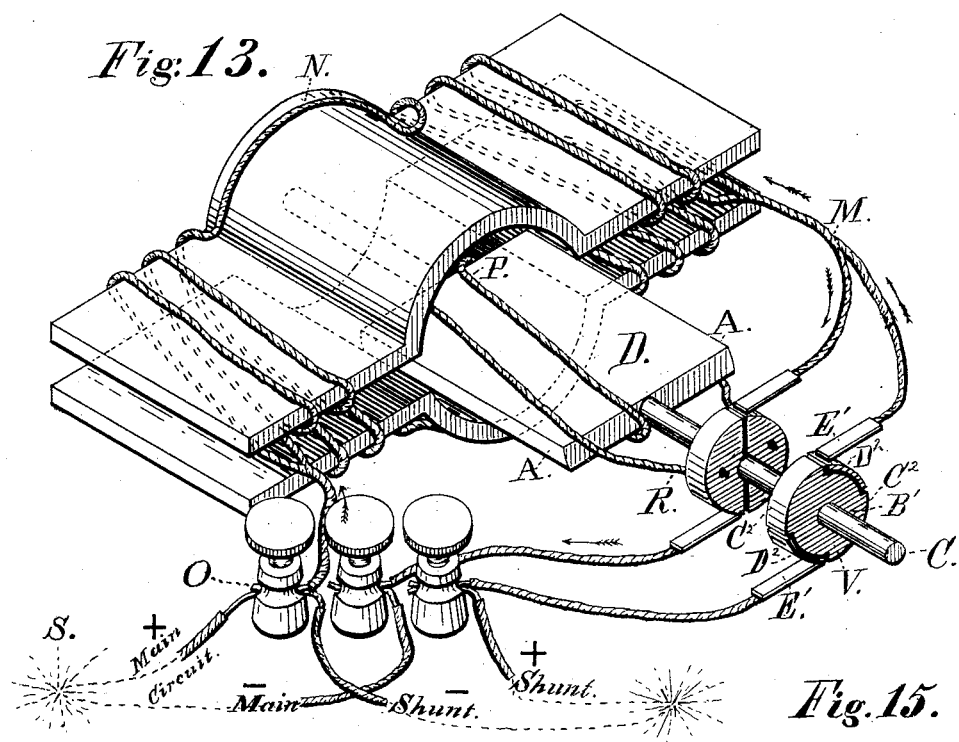
Fig. 13.
Fig. 15.
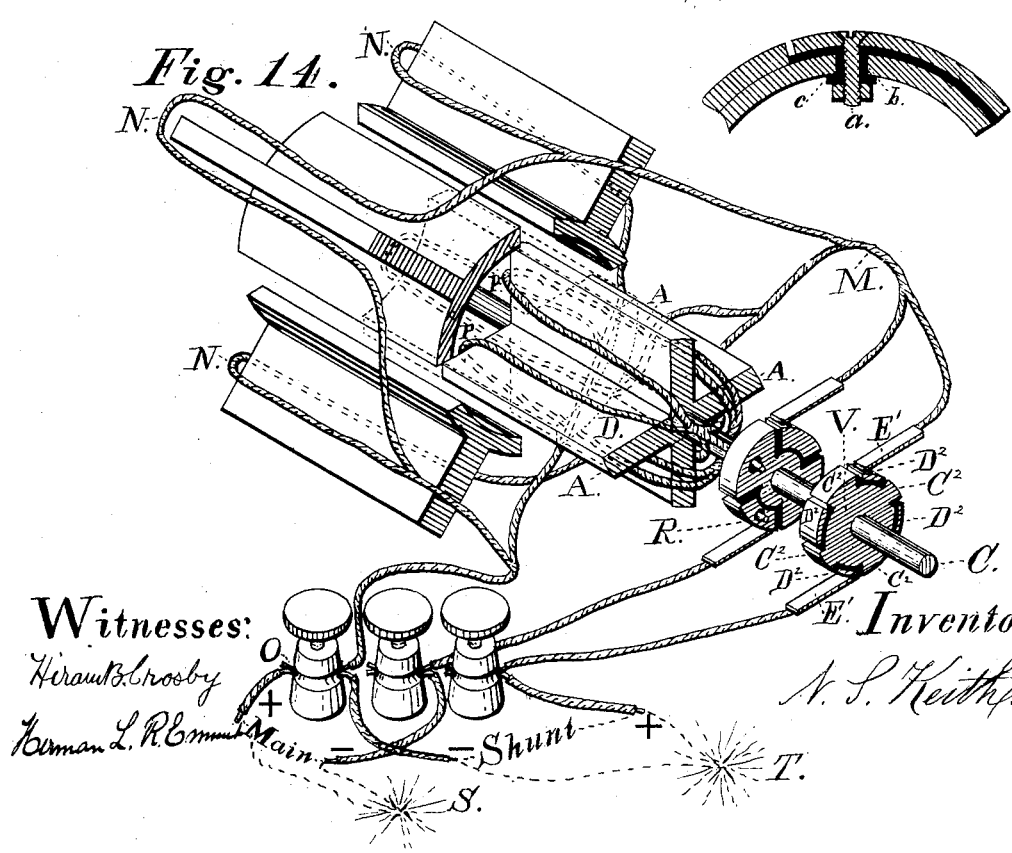
Fig. 14.
Witnesses:
Hiram B. Crosby
Herman L. R. Emmet
Inventor:
N. S. Keith

UNITED STATES PATENT OFFICE.

NATHANIEL S. KEITH, OF NEW YORK, N. Y.

DYNAMO-ELECTRICAL MACHINE.

SPECIFICATION forming part of Letters Patent No. 228,763, dated June 15, 1880.

Application filed April 22, 1879.

*To all whom it may concern:*

Be it known that I, NATHANIEL SHEPARD KEITH, of the city, county, and State of New York, have invented some new and useful Improvements in Dynamo-Electric and Magneto-Electric Machines; and I do hereby declare that the following is a full and exact description of the same, reference being made to the accompanying drawings.

My improvements relate, primarily, to the forms and arrangements of parts of machines used for generating currents of electricity which embody field-of-force electro-magnets, between the poles of which are rotated cores of iron surrounded by coils of wire, which cores and coils associated are called "armatures," in which armature-coils and in the coils of the field-of-force electro-magnets currents of electricity are generated by mutual induction. They are also applicable, in part, to machines using permanent magnets for the field-of-force.

More specifically, my improvements are—

First, improved form of the pole-faces of the field-of-force magnets of dynamo-electric and of magneto-electric machines, and consequent change in the shape and dimensions of the spaces, called by some the "fields-of-force," in which the armatures are rotated.

Second, improved forms of armature cores and poles.

Third, a rotary automatic circuit maker and breaker, or, as it may also be called, a "rotary automatic circuit closer and opener."

Fourth, a shunt-circuit into which are turned the opposing currents which are generated in the coils of fields-of-force electro-magnets and armatures composing dynamo-electric machines during periods in the rotation of their armatures, so arranged and operated that these opposing electric currents may be utilized in the shunt-circuit, while at the same time their detrimental effects in the coils of the machines are prevented.

Fifth, I combine these various improvements aforesaid one with another or with others, to form a dynamo-electric or magneto-electric machine.

Sixth, I combine these various improvements aforesaid (one or more of them) with the several parts of other dynamo-electric or magneto-electric machines.

Seventh, these named improvements are based upon my discovery of the fact of the existence of currents of electricity in the coils of the field-of-force electro-magnets of nearly all dynamo-electric machines during periods in the rotation of their armatures, which have a direction opposite to the currents of the armature-coils during the same periods, and which have also a direction opposite to the currents utilized external to the machines; also, upon the further discovery that by providing a path into which these opposing currents are turned various advantages are gained, such as saving of power, decrease of heat in the machines, saving in amount and expense of materials, and the like, after a manner which will be hereinafter more fully explained.

In the construction of those magneto-electric and dynamo-electric machines in which armatures are rotated in the field-of-force between the poles of permanent magnets in the one case and of electro-magnets in the other—that is to say, in the space more or less inclosed by the pole-faces of such magnets—it has been the aim of electricians and manufacturers of such machines to have the faces of the poles of the magnets conform in shape and curvature as closely as possible to the cylindrical spaces which the armatures occupy during their rotation. These pole-faces have been made of various dimensions, from a small fraction of the circumference of the cylindrical spaces aforesaid to nearly one-half, but always were arcs of circles but a trifle larger than those described by the extreme radii of the armatures during rotation, and were concentric therewith.

This construction aids in keeping to its maximum the magnetic strength of the field-of-force magnets by reason of a more nearly constant closure of the magnetic circuit—a result of the longer continued proximity of the poles of the cores of the armatures to the field-of-force magnet-poles. This construction also decreased the opposing currents aforesaid to the minimum possible under such construction, (though the existence of the opposing currents was not recognized;) but it also decreased the continuity of the electric currents, making them more impulsive, with longer intervals between the impulses, for the reason that no electric currents are induced in the coils of electro-magnets unless there is a change going on in the strength of magnetism of their cores. In such construction of dynamo-electric and magneto-electric machines continuity of currents is not to be gained, as the only changes in magnetism of any magnitude take place when the poles of the armature-cores change polarity by movement from the field-of-force magnet-poles of one name to those of opposite name. My improvements calculated to avoid these defects I describe farther on in this specification.

It is the practice with electricians and manufacturers of dynamo-electric and of magneto-electric machines to so enlarge and extend the pole ends and faces of the armature-cores of such machines that they span nearly from pole to pole of the field-of-force magnets. In some cases these faces and ends are so extended that they cover over the space from the edge of one field-of-force-magnet pole-face to that of the next pole-face. As it is with the form which they give to the field-of-force-magnet pole-faces and to the form of the spaces provided for the armatures to rotate in, as I have hereinbefore described, so this practice is for the purpose of aiding in keeping the maximum magnetic strength of the field-of-force magnets by reason of a more nearly perfect constant closure of the magnetic circuit.

As such extended faces to the poles of armatures would keep the magnetism in field-of-force magnets having my improved form of pole-faces and armature-spaces a considerable portion of the time of rotation of the armatures without progressive and retrogressive regularity of changes, and as it is desirable under my invention to have such change, for the reasons set forth herein, I make the pole ends of armature-cores by my improvement not greater in area of section than the bodies or arms of the cores, and preferably in some cases I make them less.

In order to make the changes of magnetism in the cores of armatures and of field-of-force magnets of dynamo-electric and magneto-electric machines less impulsive and with less time between the changes of magnetic condition, or, in other words, as nearly as possible continuous, varying constantly during the rotation of the armatures in regular rise and fall, I not only use armatures having the pole ends made as I have just described, but I also so change the shape and size of the field-of-force-magnet pole-faces of machines having only two field-of-force magnet-poles that the armature-spaces between and inclosed by them have a shape somewhat elliptical in cross-section instead of circular or cylindrical. The shorter diameter of the ellipse is on the line drawn from the point of greatest magnetic strength of the field-of-force magnet-pole of one name to the like point of the opposite pole of like or unlike name. This shorter diameter is only sufficient to allow the armature used to rotate.

By this construction the poles of the armature-cores are during rotation either continually approaching or receding from the poles of the field-of-force magnets, and there is a corresponding continuity in the currents of electricity generated. I collect by the usual commutators and brushes or springs such of these currents as can be utilized in that manner.

Figure 2:
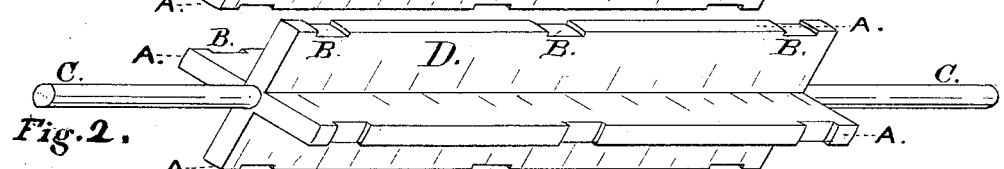
Figure 3:
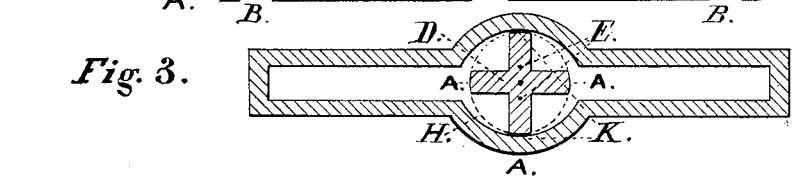
Figure 4:
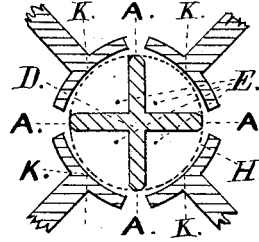
Figure 5:
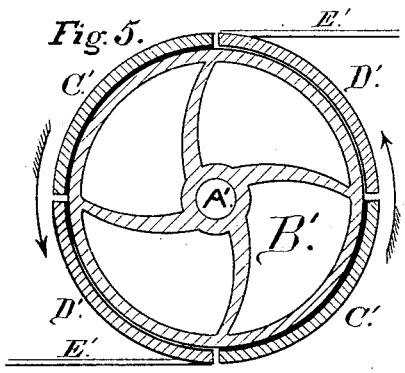
Figure 6:
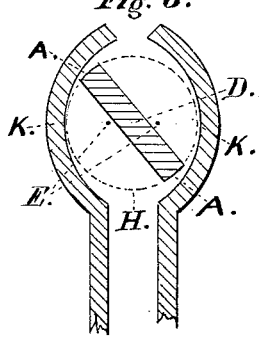
Figure 7:
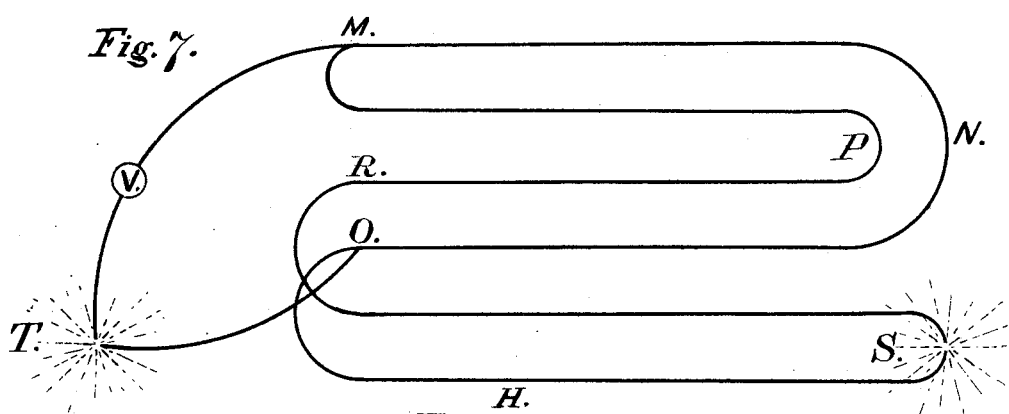
Figure 8:
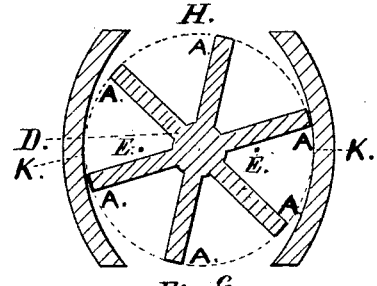
Figure 9:
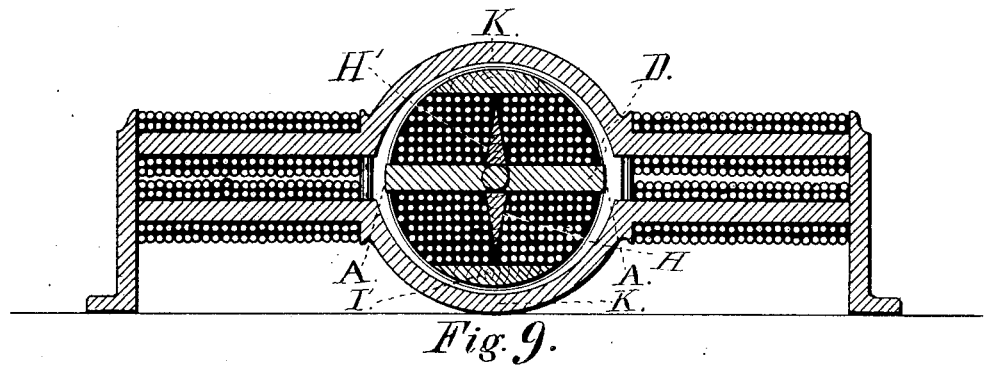
Figure 10:
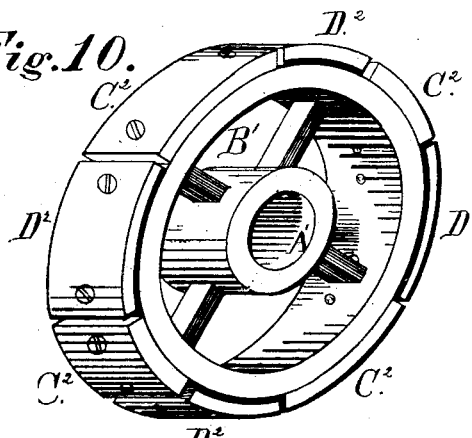
Figure 11:
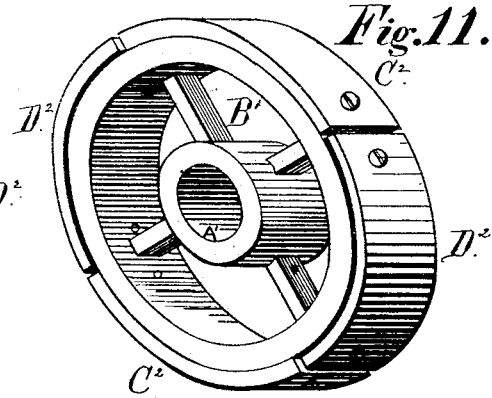
Figure 12:
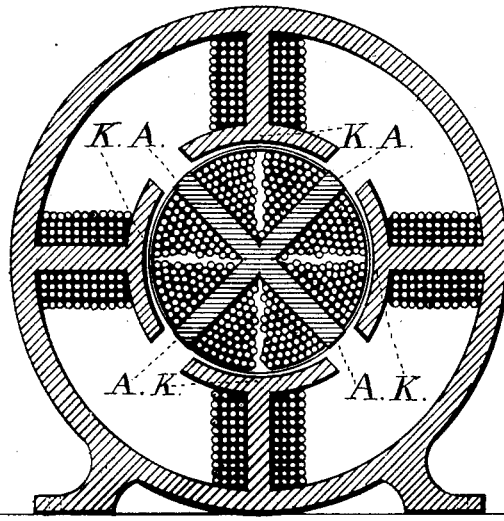

Referring to the accompanying drawings, like letters referring to like parts in all of the figures, Figure 1 represents an armature-core of my improved form to be used in magneto-electric machine, or dynamo-electric machine, having two field-of-force magnet-poles. It is a rectangular plate, D, of soft iron, provided with axial extensions C C at right angles with its poles, and with recesses B B B, &c., on the poles A A, calculated to receive bands placed circumferentially for the purpose of retaining the coils of insulated copper wire which is longitudinally wound upon it—i. e., parallel with its axis. Fig. 2 represents an armature-core of my improved form, calculated to be used in magneto-electric machines, or in dynamo-electric machines, having four field-of-force magnet-poles. It has four radial arms, D, of soft iron, provided with axial extensions C C, and with recesses B B, &c., as and for the same purposes as in Fig. 1. Fig. 3 is a view, in cross-section, of a four-armed armature-core of my improved form placed in the magnetic field of field-of-force magnets having my improved form of polar faces. Fig. 4 is a view, in cross-section, of a four-armed armature-core having my improved form of poles placed in the magnetic field of field-of-force magnets having four poles of my improved form. Fig. 5 is a view, in cross-section, of my circuit maker and breaker, which is more fully illustrated in Figs. 10 and 11. Fig. 6 represents, in cross-section, a two-armed armature-core placed in the magnetic field of a field-of-force magnet of two pole-faces of my improved form. Fig. 7 is a diagram illustrating the two derived circuits in which two currents are utilized from the dynamo-electric machine of my invention embodying the features herein set forth. Fig. 8 is a view, in cross-section, of a six-armed armature-core placed in the magnetic field of magnet-poles of my invention. Fig. 9 is a view, in cross-section, of the cores and coils of one of my dynamo-electric machines having a two-pole armature in the field of two consequent poles of field-of-force electro-magnets. Fig. 10 is an isometric perspective view of my automatic circuit maker and breaker used on the axis of a four-armed armature in the magnetic field of a machine having four field-of-force magnet-poles. Fig. 11 is an isometric perspective view of my automatic circuit maker and breaker used on axis of a two-armed armature in the magnetic field of a machine having two field-of-force magnet-poles. Fig. 12 is a view, in cross-section, of the cores and coils of one of my dynamo-electric machines having a four-pole armature in the field of four field-of-force electro-magnet poles. Fig. 13 is an isometric perspective view, showing the direction and arrangement of the circuits of one of my machines having two consequent field-of-force magnet-poles and a two-pole armature, and with my shunt-circuit. Fig. 14 is an isometric perspective view, showing the direction and arrangement of the circuits of one of my machines having four field-of-force electro-magnet poles, a four-pole armature, and my shunt-circuit. Fig. 15 is a view in section, showing the manner of insulating the screws which attach the insulated segmental plates on the circuit maker and breaker.

In detail, A A, &c., are the pole ends of the various armature-cores.

B B, &c., are recesses or depressions in the poles of the armatures, which serve to receive the bands which are bound circumferentially around the armatures after the coils of insulated copper wire have been placed upon the cores—a condition shown in Figs. 9 and 12. These bands keep the coils from becoming displaced by the rotation of the armatures.

C C, &c., are axial extensions of the armature-cores, which serve as journals for rotating the armatures, for receiving the driving-pulley, the commutator, and the circuit maker and breaker, Figs. 5, 10, and 11.

D D, &c., are the armature-cores in the various figures.

E E, &c., are the centers from which spring the radii of the arcs of circles which are the pole-faces of the field-of-force magnets.

H H, &c., are the circles described by the armature-pole ends in their rotation on their axes.

K K, &c., are the places on the field-of-force-magnet pole-faces which magnetically attract most strongly the armature-cores.

H′ H′ in Fig. 9 are two triangular strips of wood used to fill the space which would otherwise be left in winding the coils on the armature-core parallel with its axis.

I′ I′ are two segment-shaped pieces of wood used to fill the segmental spaces left when it is not desirable to completely fill the armature with insulated wire. They also assist the bands in keeping the wires in place.

In dynamo-electric machines of ordinary construction there are electric currents generated in the coils of the field-of-force electro-magnets during certain periods in the rotation of their armatures which have a direction contrary to those which are generated in the armature-coils and to those which are used externally. These currents act as counter-force and resistance, and react upon each other in the coils of the machine without beneficial external effect, necessitating the use of much mechanical force to overcome and counteract their effects, and by reason thereof there is excessive heating of the machines. The same opposing currents are generated in the coils of field-of-force electro-magnets having their pole-faces and the pole-faces of the armatures made according to my improved form; but by reason of the gradual change in the strength of the magnetism of their cores the currents approach continuity during the time of their existence.

For the purpose of utilizing these opposing currents both in dynamo-electro machines having poles after my improved form and in dynamo-electric machines of ordinary construction, I provide by my improvement a shunt which is a special derived circuit, into which I divert the opposing currents in the coils of a dynamo-electric machine at the proper period in the rotation of its armature by means of an automatic circuit maker and breaker, Figs. 5, 10, and 11, which is, for convenience and precision, made circular, and is fastened on one of the axial extensions of the armature-core in obvious manner. The ends of this shunt are connected one with the positive end of the coils of the field-of-force magnets of the machine and the other end with the negative end of the coils. This arrangement is shown in diagram in Fig. 7 and in perspective in Figs. 13 and 14. The line M N O represents that portion of the main circuit which is the coils of the field-of-force electro-magnets, and the line M P R that portion of the main circuit which is the coils of the armature; and R S O is that portion of the main circuit which is the external conductors, in which may be the electric light S, electroplating-cells, electro-motors, &c., as is usual. M N O S R P M is the complete main circuit.

During certain portions of the rotation of the armatures the mutually-induced currents in the coils of the field-of-force electro-magnets and in the coils of the armatures have a common direction and assist one another; but at certain other portions of the rotation they have opposite directions, meeting at M and O, from whence they would flow if a path or circuit be provided. If such path be not provided, the currents from the coils of the field-of-force electro-magnets having the greater electro-motive force overcome the currents from the coils of the armatures, and not only neutralize them, but cause currents to flow through the armature-coils and the external portion of the circuit in a direction contrary to that desired, not only without beneficial effect, but with positive detriment.

The line M V T O represents the shunt which I have provided. It is connected with the ends of the coils of the field-of-force electro-magnets at M and O. The circuit maker and breaker is at V. During the existence of the opposing currents the shunt-circuit is closed by the action of V, the electrically-connected parts of which are at the time in contact with the brushes or springs E E, allowing the meeting opposing currents to flow through the shunt-circuit. The shunt-circuit is opened by the same device, the rotation of which brings the brushes E E in contact with the two oppositely-placed insulated plates, $D^2$ $D^2$, when the currents in the armature-coils and electro-magnet coils are in the same direction.

The main circuit remains constantly closed. The shunt may be of any desirable length, and electric work, such as electric light, T, depositing or plating cells, magnetic apparatus, &c., may constitute part of it.

The circuit maker and breaker, or, as it may be called, "the circuit closer and opener," is made as follows: Referring to Figs. 5, 10, and 11, upon the axis C of the armature is fastened the metallic wheel B' by the axial hole A'. On the wheel B' are securely fastened, by screws or similar means, curved segmental plates or pieces of metal, C' C' D' D' or $C^2 C^2 D^2 D^2$, all of equal size. Their number is twice that of the pole ends of the armature to which they are attached. The drawings, Figs. 5 and 11, represent one for two poles. An armature having four poles must have a circuit maker and breaker with eight plates, as shown in Fig. 10. Commencing with one, that and all the alternate plates around the wheel must be electrically connected together. They may be fastened in direct metallic contact with the wheel, as shown at $C^2 C^2$, &c., in Figs. 10 and 11. The intermediate plates, $D^2 D^2$, &c., are also fastened to the wheel, but by means which keep them electrically insulated from each other and from all other parts of the wheel and machine. As shown in Fig. 15, $a$ is a screw-bolt, passing through the metal of the rim of the wheel, but insulated therefrom by the insulating sleeve or tube $b$ and washer $c$. The thick black lines between the rim of the wheel and the segmental plates in Figs. 10, 11, and 15 represent the insulating material (vulcanite, for instance) which electrically separates the parts.

This circuit maker and breaker may also be made a solid cylinder of material which is a non-conductor of electricity, upon which the plates are fastened; but half the plates must be electrically connected and the other half electrically insulated, as before described; or the wheel or cylinder may be made of equal-sized metallic segments, but must have like connections and insulations. Metallic brushes or springs E' E', which are connected with the other portions of the shunt, as shown in Figs. 13 and 14, are caused to press on this instrument at points diametrically opposite. The circuit maker and breaker is so fastened on the axis of the armature that during its rotation these brushes or springs press on diametrically-opposite alternate plates (that is, those which are electrically connected) during the existence of the opposing currents, thus closing the circuit for the currents to flow in it. During other portions of the rotation the brushes press on the plates which are electrically insulated, thus opening the shunt-circuit while the currents flow in the main circuit in one direction. Thus the shunt-circuit is closed only during the existence of the opposing currents, and they flow in one direction in it in intermittent succession. These opposing currents exist in the field-of-force electro-magnet coils during that period in the rotation of the armature in which the armature-poles are leaving the place of greatest attractive force of the field-of-force electro-magnet poles, and also in machines of ordinary construction during the period in the rotation in which no change of polarity of the armatures is taking place.

I also connect the shunt-circuit described to the coils of all dynamo-electric machines in which such opposing currents are generated or induced.

In this specification, where I use the term "field-of-force magnet" I mean, as ordinarily understood by electricians, that larger permanent or electro magnet between the poles of which an armature is rotated, and which induces magnetism in the cores of its armature and electricity in the armature-coils. Where I use the term "dynamo-electric machine" I mean, as ordinarily understood by electricians, a machine in which electric currents are generated in the coils of the electro-field-of-force magnets, and in the coils of an associated armature by mutual induction and accumulation during the rotation of the armature. Where I use the term "magneto-electric machine" I mean, as ordinarily understood by electricians, a machine in which currents of electricity are generated by magnetic inductive action of field-of-force permanent magnets on the cores and coils of associated armatures during rotation of the armatures.

I am aware that a shunt-circuit has been used to periodically connect electrically the ends of the coils of electro-magnets of electro-motors having armatures without coils; but it differs from my device in the fact that when that shunt-circuit is closed it is entirely independent of all other circuits. When my shunt-circuit is closed it is one of two or more derived circuits, all closed, branching at the positive and negative ends, as at O and M, respectively, of the coils of the field-of-force electro-magnets of dynamo-electric machine, as shown fully in Figs. 13 and 14.

Having described my invention, I claim—

1. In magneto-electric machines and dynamo-electric machines, magnet pole-faces which are arcs of circles greater than the circles described by rotating their armatures, and whose radii spring from centers removed from the centers of the axes of the armatures, substantially as and for the purposes described.

2. The combination of a dynamo-electric machine and a shunt which connects the ends of the coils of the field-of-force electro-magnets of the machine, said shunt being one of two or more derived circuits, and consisting of connections, conductors, springs or brushes, and an automatic circuit maker and breaker operating to close the shunt-circuit during the existence of opposing currents in the coils of the magnets of the machine, substantially as and for the purposes specified.

3. In the use of dynamo-electric machines, the mode of utilizing the opposing currents generated in the coils of their magnets, which consists in automatically closing a shunt-circuit which connects the positive and negative ends of the field-of-force electro-magnet coils during the existence of such currents, said shunt-circuit being one of two or more derived circuits, and having placed therein the apparatus for the production of heat, light, electrolysis, magnetism, or like effects, substantially as and for the purposes described.

4. In the use of dynamo-electric machines, the mode of diverting the opposing currents generated in the coils of the armature and field-of-force magnets of such a machine into a special shunt-circuit, which consists in automatically closing the special circuit during the existence of such currents, substantially as and for the purposes described.

5. In magneto-electric machines and dynamo-electric machines, the combination which consists of one or more field-of-force magnets, having their pole-faces arcs of circles greater than the circles described by rotating their armatures, and whose radii spring from centers removed from the centers of the axes of the armatures, with an armature which is rotated in the field-of-force or space enveloped by such pole-faces, substantially as and for the purposes described.

6. In dynamo-electric machines, a circuit maker and breaker the office of which is to electrically close and open alternately a shunt-circuit connecting the positive and negative ends of the field-of-force magnet-coils, for diverting opposing currents into a shunt-circuit, substantially as and for the purposes described.

7. A rotary circuit maker and breaker, Figs. 5, 10, and 11, which is a cylinder or wheel having four or more metallic plates fastened to its periphery, of which plates the alternate ones, $C^2 C^2$, are electrically connected together, and the intermediate ones, $D^2 D^2$, are electrically insulated from each other and from all other parts, substantially as and for the purposes described.

8. In magneto-electric machines and dynamo-electric machines, an armature composed of a core of soft iron having the shape of a rectangular plate, the edges being the poles, with two axial extensions at right angles to its poles, coils of insulated conductors wound longitudinally on such core, and bands placed circumferentially over all to hold the parts in place, in combination with field-of-force magnets whose pole-faces are arcs of circles greater than the circle described by rotating the armature, and whose radii spring from centers removed from the center of the axis of the armature, substantially as and for the purposes described.

N. S. KEITH.

Witnesses:
JACOB JACOBS,
THADDEUS HYATT.